(12) United States Patent
Moore et al.

(10) Patent No.: US 8,025,307 B2
(45) Date of Patent: Sep. 27, 2011

(54) ANTI-SWAY TRAILER HITCH DEVICES

(75) Inventors: Christopher Moore, Elkhart, IN (US);
Pete Bolenbaugh, Elkhart, IN (US);
David Hoover, Sturgis, MI (US);
Rodney Peterson, Elkhart, IN (US)

(73) Assignee: The Coast Distribution System, Inc., Morgan Hill, CA (US)

( * ) Notice: Subject to any disclaimer, the term of this patent is extended or adjusted under 35 U.S.C. 154(b) by 0 days.

(21) Appl. No.: 12/335,319

(22) Filed: Dec. 15, 2008

(65) Prior Publication Data

US 2009/0152832 A1  Jun. 18, 2009

Related U.S. Application Data

(60) Provisional application No. 61/013,945, filed on Dec. 14, 2007, provisional application No. 61/199,155, filed on Nov. 12, 2008.

(51) Int. Cl.
*B60D 1/32* (2006.01)
(52) U.S. Cl. .................................................. 280/455.1
(58) Field of Classification Search ............. 280/494, 280/455.1, 405.1, 406.1, 406.2, 489, 484; 172/450
See application file for complete search history.

(56) References Cited

U.S. PATENT DOCUMENTS

| | | | | |
|---|---|---|---|---|
| 2,329,380 A | * | 9/1943 | Arehart | 280/484 |
| 2,768,837 A | * | 10/1956 | Prater | 280/455.1 |
| 2,912,256 A | * | 11/1959 | Morkoski | 280/449 |
| 3,572,750 A | * | 3/1971 | Derr, Jr. | 280/455.1 |
| 3,602,529 A | | 8/1971 | Derr | |
| 3,778,088 A | * | 12/1973 | Alexander | 280/406.2 |
| 3,814,463 A | * | 6/1974 | Tunesi | 280/406.2 |
| 4,023,863 A | | 5/1977 | Sisson et al. | |
| 4,213,627 A | * | 7/1980 | Thompson | 280/406.2 |
| 4,402,523 A | | 9/1983 | Knowles | |
| 4,601,486 A | | 7/1986 | Marcq | |
| 4,862,971 A | | 9/1989 | Azzarello et al. | |
| 5,240,273 A | * | 8/1993 | Stead et al. | 280/489 |
| 5,860,864 A | * | 1/1999 | Vukovic | 464/147 |
| 5,868,414 A | | 2/1999 | McCoy et al. | |
| 5,910,217 A | | 6/1999 | Sargent | |
| 5,984,341 A | | 11/1999 | Kass et al. | |
| 6,065,549 A | | 5/2000 | Schlegel | |
| 6,283,489 B1 | | 9/2001 | Hoog | |
| 6,286,851 B1 | * | 9/2001 | Sargent | 280/455.1 |
| 6,485,046 B1 | | 11/2002 | Hsueh et al. | |
| 6,820,887 B1 | | 11/2004 | Riggle | |
| 7,032,919 B1 | * | 4/2006 | Hahne et al. | 280/493 |
| 2002/0101055 A1 | * | 8/2002 | Warren | 280/477 |
| 2008/0122198 A1 | | 5/2008 | Anderson | |

OTHER PUBLICATIONS

Canadian Intellectual Property Office, Requisition by the Examiner, Feb. 23, 2011, 2 pages.

* cited by examiner

*Primary Examiner* — Anne Marie Boehler
*Assistant Examiner* — Daniel Yeagley
(74) *Attorney, Agent, or Firm* — Kolisch Hartwell, P.C.

(57) ABSTRACT

The present disclosure relates trailer hitch devices for towing a trailer behind a vehicle. The present disclosure provides a hitch and associated structures which provide an anti-sway function. More specifically, the present disclosure provides an anti-sway trailer hitch including an anti-sway device for the hitch, wherein the anti-sway device includes: a sway bar attachment member having a cammed surface; and a sway controller having a bias mechanism adapted to bias a travel axis of the trailer toward a travel axis of the towing vehicle through an interaction between the cammed surface of the sway bar attachment member and the bias mechanism.

20 Claims, 5 Drawing Sheets

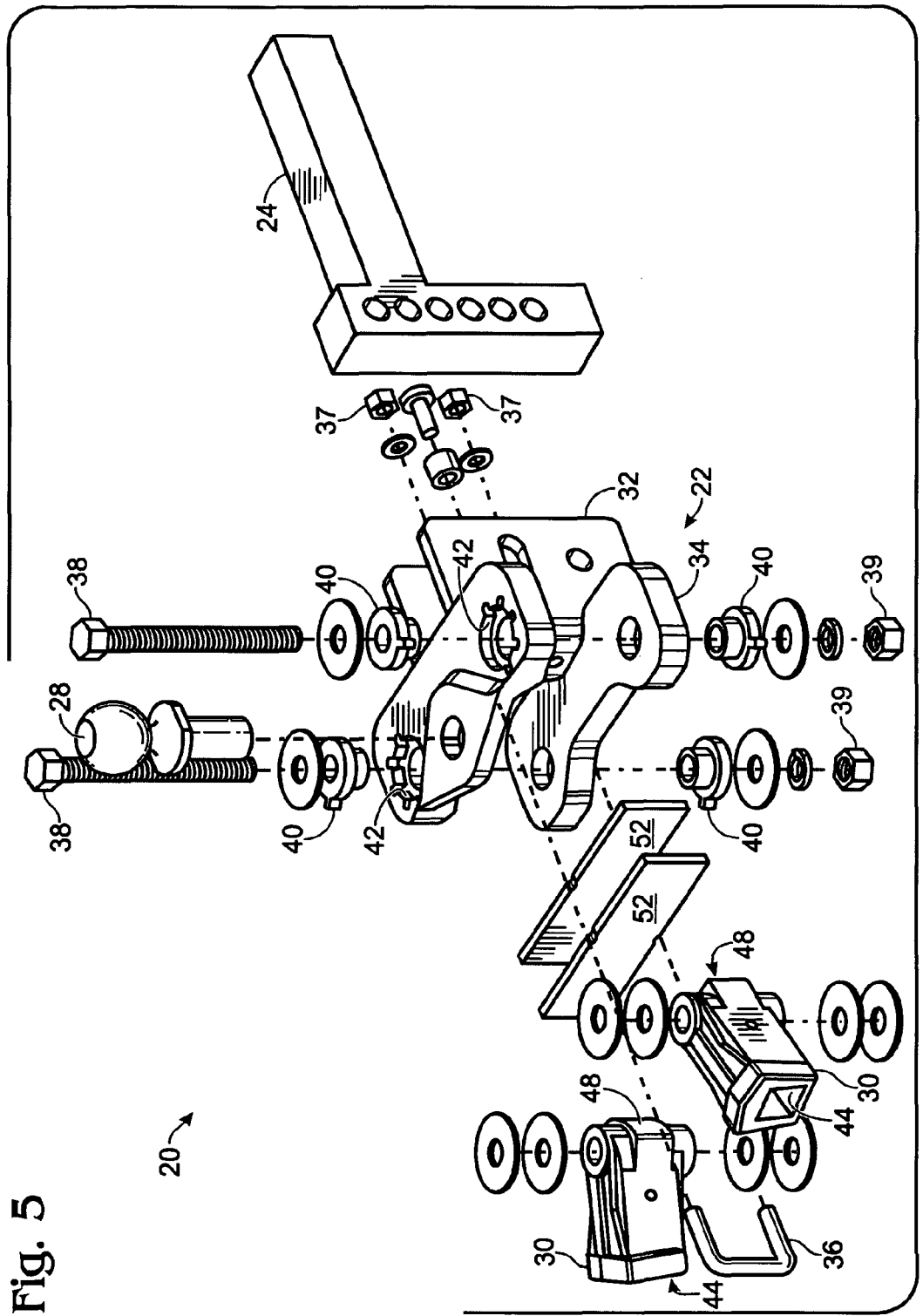

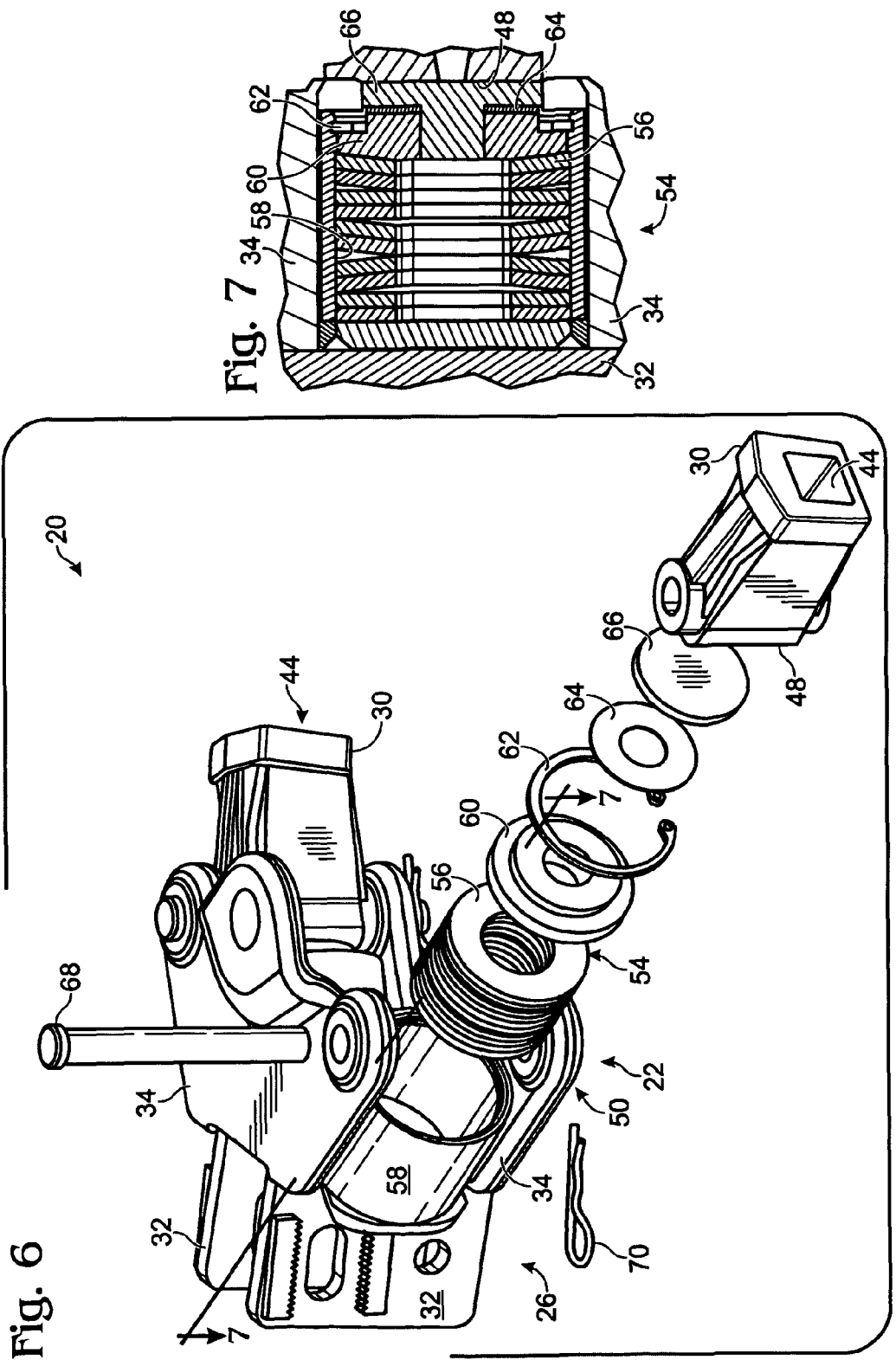

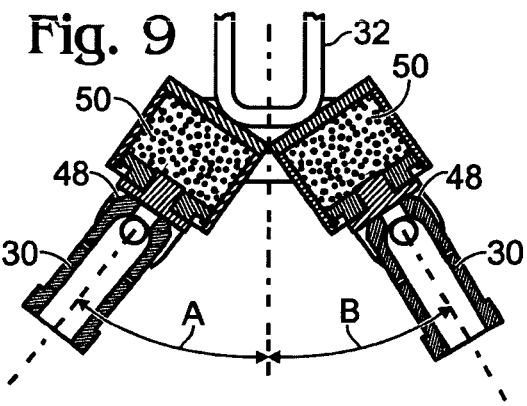
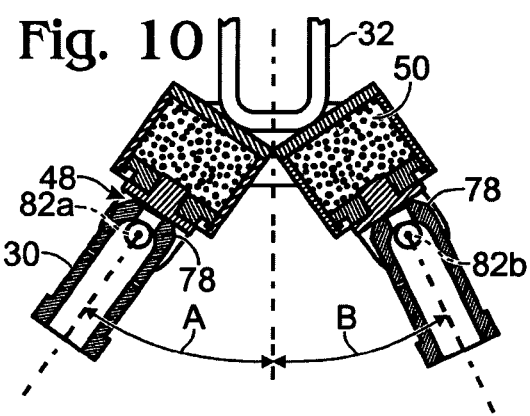
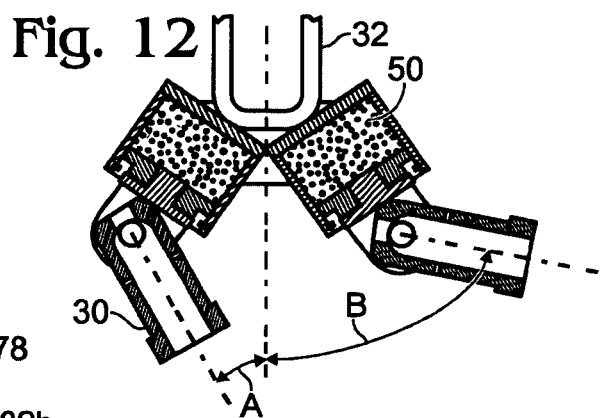
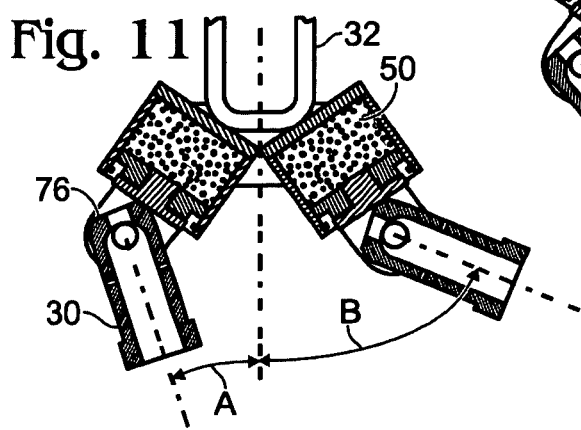
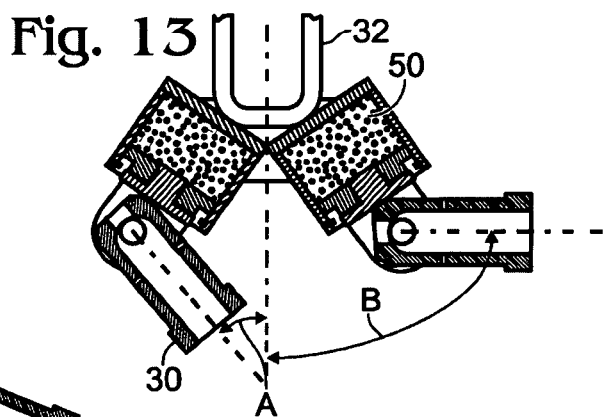

ANTI-SWAY TRAILER HITCH DEVICES

CROSS REFERENCE TO RELATED APPLICATIONS

This application claims the benefit of and priority under 35 U.S.C. §119(e) to U.S. Provisional Patent Application No. 61/013,945 entitled "ANTI-SWAY TRAILER HITCH DEVICES," filed Dec. 14, 2007, and U.S. Provisional Patent Application No. 61/199,155 entitled "WEIGHT DISTRIBUTING HITCH WITH BUILT-IN SWAY CONTROL", filed Nov. 12, 2008, the disclosures of which are incorporated herein by reference.

BACKGROUND

Because a typical trailer hitch couples a trailer to a towing vehicle at a spot behind the rear axle of the towing vehicle, any substantial (or even slight) lateral movement of the forward end of the towed trailer can result in simultaneous lateral shifting of the forward end of the towing vehicle. Lateral movement in the trailer that is not induced by the operator of the towing vehicle can be exceedingly dangerous. Such lateral movement might be caused by, for example, the impact of a strong crosswind on a trailer having a large side cross-sectional area. Similar dangerous movements may be caused by a slipstream impact from a large passing vehicle. These effects can be exacerbated if the trailer is not properly loaded, such as when the center of gravity of a trailer load is disposed forward of the wheels of the trailer and a substantial proportion of its mass rests on the hitch.

Trailer hitches having no anti-sway function provide no resistance to lateral loads induced by trailer movement. Trailer hitches having an anti-sway function provide some resistance to lateral loads, but known hitches do not have the capability to actively correct sway. Known devices also are not capable of automatically releasing anti-sway corrective forces when they are no longer needed, such as when a user maneuvers a towing vehicle and a trailer in tight spaces and lateral movements of the trailer are desired.

BRIEF DESCRIPTION OF THE FIGURES

FIG. 5 is an exploded view of the anti-sway trailer hitch device of FIG. 4.

FIG. 6 is an exploded view of an embodiment of an anti-sway trailer hitch device, according to aspects of the present disclosure.

FIG. 7 is a detail of a portion of the anti-sway trailer hitch device of FIG. 6.

FIG. 9 is a depiction of a first angular movement of an embodiment of an anti-sway trailer hitch device.

FIG. 10 is a depiction of a second angular movement of the anti-sway trailer hitch device of FIG. 9.

FIG. 11 is a depiction of a third angular movement of the anti-sway trailer hitch device of FIG. 9.

FIG. 12 is a depiction of a fourth angular movement of the anti-sway trailer hitch device of FIG. 9.

FIG. 13 is a depiction of a fifth angular movement of the anti-sway trailer hitch device of FIG. 9.

DETAILED DESCRIPTION

Figure 1:
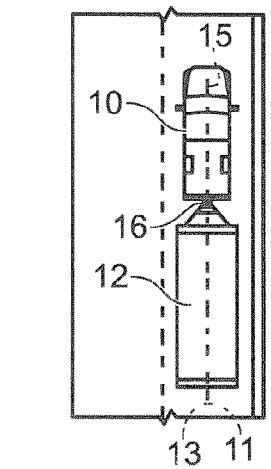
FIG. 1 is a schematic view showing typical sway of a trailer attached to a first hitch on a towing vehicle, where the hitch provides minimal resistance to lateral loads.
Figure 2:
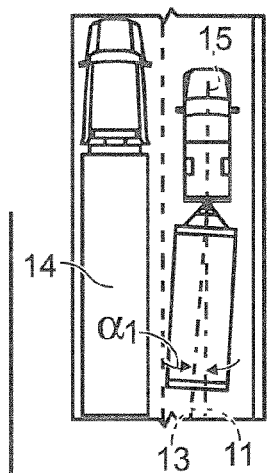
FIG. 2 is a schematic view showing typical sway of a trailer attached to a second hitch on a towing vehicle, where the hitch provides enhanced resistance to lateral loads.
Figure 3:
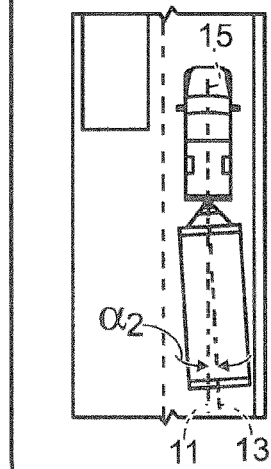
FIG. 3 is a schematic view showing typical sway of a trailer attached to an anti-sway trailer hitch device on a towing vehicle, according to aspects of the present disclosure.

FIGS. 1-3 show the general benefits of using an anti-sway trailer hitch device of the present disclosure with a towing vehicle 10 coupled to a trailer 12. FIGS. 1-3 show that a towing vehicle 10 and a trailer 12 may be in a coupled relationship as the combined vehicle travels down a roadway. FIGS. 1-3 also show that a large passing vehicle 14 (or a substantial crosswind) may cause the trailer to undergo a series of oscillations behind the towing vehicle.

FIG. 1 shows that a typical, unmodified trailer hitch 16 may not prevent or correct a sway motion of a trailer once it is influenced by a disruptive force. In the top panel a vehicle and trailer (a combined vehicle) travel, undisturbed, in a straight line in a traffic lane, along what can be described as the combined vehicle's axis of travel 11. Travel axis 11 of the combined vehicle generally will be coincident with the travel axis 15 of the vehicle 10.

In the middle panel, the trailer's movement may be disrupted by a sideways force, such as a crosswind or (as illustrated) the aerodynamic force of a large passing vehicle. As indicated, the trailer may be pulled into a vortex in the slipstream of the large vehicle, causing the trailer to drift to one side of its lane, potentially pulling the towing vehicle with it. Angle $\alpha 1$ represents the angle formed between the trailer's travel axis 13 and the combined vehicle's original axis of travel 11 upon initial disruption of the trailer's travel. In the bottom panel, the large vehicle having passed (or the crosswind having ceased), the trailer is no longer pulled to one side of its traffic lane and the towing vehicle attempts to pull it back into the center of the lane. Movement of the trailer back toward the center of the lane is unrestricted, however, and the trailer will continue past the center of the lane and move to the second side of its lane. Angle $\alpha 2$ represents the angle formed between the trailer's travel axis 13 and the combined vehicle's original axis of travel 11 when the trailer swings back. This "whipsawing" or oscillating motion, where $\alpha 1$ and $\alpha 2$ may be similar to each other and which may both be relatively large (especially as compared to the angles shown in FIGS. 2 and 3), is potentially quite hazardous and is not dampened by a standard trailer hitch.

FIG. 2 shows a trailer hitch 18 that may dampen a swaying motion of a trailer upon it being influenced by a disruptive force. In the top panel a vehicle and trailer (a combined vehicle) travel, undisturbed, in a straight line in a traffic lane, along what can be described as the combined vehicle's axis of travel 11. In the middle panel, the trailer's movement may be disrupted by a sideways force, such as a crosswind or (as illustrated) the aerodynamic force of a large passing vehicle. The trailer thus may be pulled into a vortex in the slipstream of the large vehicle, causing the trailer to drift to one side of its lane, potentially pulling the towing vehicle with it. In this case, however, the trailer hitch has an anti-sway mechanism that dampens the side-to-side motion of the trailer, lessening the degree to which it moves sideways in its lane. Angle $\beta 1$ represents the angle formed between the trailer's travel axis 13 and the combined vehicle's original axis of travel 11 upon initial disruption of the trailer's travel. In the bottom panel, the large vehicle having passed (or the crosswind having ceased), the trailer is no longer pulled to one side of its traffic lane and the towing vehicle attempts to pull it back into the center of the lane. Movement of the trailer past the center of the lane is somewhat restricted, however, and the trailer continues past the center of the lane and moves to the second side of its lane. Angle $\beta 2$ represents the angle formed between the trailer's travel axis 13 and the combined vehicle's original axis of travel 11 when the trailer swings back. Here again, though, the dampening effect of the anti-sway hitch decreases the sideways travel of the trailer and keeps it from moving as far in either direction as does a trailer coupled to a standard trailer hitch. Angles $\beta 1$ and $\beta 2$ may be similar to each other. Anti-sway devices may help reduce at least angle $\beta 1$ relative to angles $\alpha 1$ and $\alpha 2$.

FIG. 3 shows an anti-sway trailer hitch 20 according to the present disclosure. Anti-sway trailer hitch 20 may dampen and/or actively correct a swaying motion of a trailer influenced by a disruptive force. In the top panel a vehicle and trailer (a combined vehicle) travel, undisturbed, in a straight line in a traffic lane, along what can be described as the combined vehicle's axis of travel 11. In the middle panel, the trailer's movement may be disrupted by a sideways force, such as a crosswind or (as illustrated) the aerodynamic force of a large passing vehicle. The trailer may initially be pulled to one side. In this case, however, a trailer hitch according to the present disclosure has an anti-sway mechanism that may completely prevent movement of the trailer into a vortex in the slipstream of the large vehicle. In fact, anti-sway trailer hitch 20 may actively correct any movement of the trailer from the aligned orientation shown in the top panel by biasing the trailer to such aligned orientation.

Angle $\chi 1$ represents the angle formed between the trailer's travel axis 13 and the combined vehicle's original axis of travel 11 upon an initial disruption of the trailer's travel. Where the dampening effect is sufficiently strong, the trailer may remain in the aligned orientation, even under influence of the aforementioned disruptive force. Where the dampening effect is not sufficiently strong to avoid sway altogether, the trailer may be biased back toward the aligned orientation, thus reducing the swaying effect.

In the bottom panel, the large vehicle having passed (or the crosswind having ceased), the trailer is no longer moved to the other side of its traffic lane (as described in connection with FIGS. 1 and 2). Because the trailer's initial sideways displacement is diminished, the overcorrection as the vehicle attempts to pull the trailer back into the center of the lane also is diminished. Angle $\chi 2$ represents the angle formed between the trailer's travel axis 13 and the combined vehicle's original axis of travel 11 when the trailer swings back.

With anti-sway trailer hitch devices of the present disclosure, the trailer does not continue past the center of its lane and dangerous oscillations of the towing vehicle/trailer combination are minimized. Angles $\chi 1$ and $\chi 2$ may be similar to each other or angle $\chi 2$ may be smaller than angle $\chi 1$. Anti-sway devices according to the present disclosure help reduce both angles $\chi 1$ and $\chi 2$ (as seen in relation to angles $\alpha 1$, $\alpha 2$, $\beta 1$, and $\beta 2$). Anti-sway devices according to the present disclosure also may be seen to bias the axis of a towed trailer toward the axis of a combined vehicle composed of a towing vehicle and the trailer by applying a corrective force to the swaying trailer (the mechanism of which is discussed in more detail below).

Figure 4:
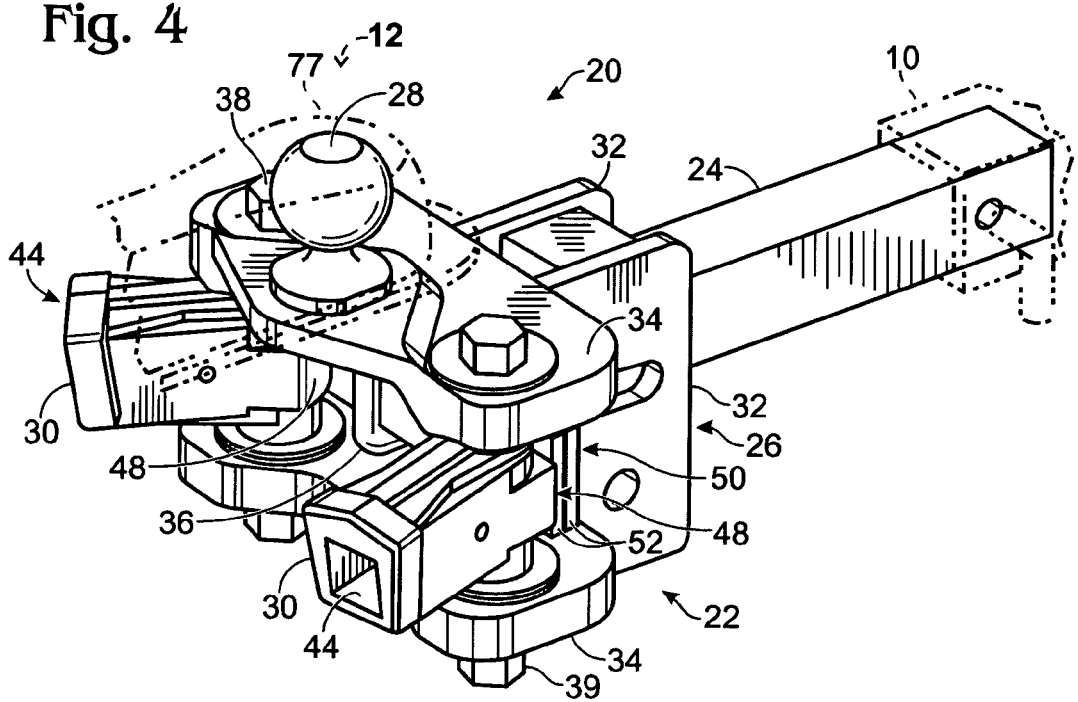
FIG. 4 is a perspective view of an embodiment of an anti-sway trailer hitch device, according to aspects of the present disclosure.

Non-exclusive examples of anti-sway trailer hitch devices are illustrated and described in the present disclosure, with a first embodiment indicated generally at 20 in FIGS. 4 and 5. As shown, anti-sway trailer hitch device 20 may include an anti-sway device, or sway controller, 22 coupled to one or more shanks 24 that can be coupled to a towing vehicle. Although illustrated with a rectangular solid shank 24, other configurations of attaching device 20 to a tow vehicle are equally within the scope of the present disclosure. Device 20, or one or more portions thereof, may also be described as weight distributing heads with built in sway control. Device 20 generally couples at an end of shank 24 to a vehicle 10 via the vehicle's receiver (shown in dashed outline). Generally, a ball 28 of device 20 couples the device to a trailer 12 via the trailer's ball receiver 77 and trailer frame 75.

Sway controller 22 may be one element in a larger hitch body 26. The hitch body may be constructed around a "frame" of vertical plates 32 and horizontal plates 34. The frame of the hitch body may be coupled to the shank by a U-bolt 36 and associated nuts 37. Hitch body 26 may support a trailer coupler, or ball, 28 for operatively connecting a towing vehicle to a trailer. In some embodiments, a structure other than a ball may be used without affecting the substance of the present disclosure One or more sway bar attachment members 30, configured to be coupled to one or more sway bars (not illustrated), may also be supported on the hitch body. The sway bar attachment members 30 may be attached to the hitch body by pins such as vertical bolts 38 and nuts 39. In some embodiments of devices 20, hitch body 26 and sway bar attachment members 30 may be configured to permit specific angular positioning of members 30 to apply a given preload (or zero load depending on the configuration) to anti-sway trailer hitch 20. In the non-exclusive example illustrated, preload of members 30 may be accomplished by manipulating the position of keyed washers 40 in keyed washer recesses 42 on plate 34. Each recess 42 may have, in the illustrated embodiment, five positions for a keyed washer, with each position corresponding to a different performance curve for the anti-sway trailer hitch. Other configurations are equally within the scope of the present disclosure and may include any number of keyed positions including no keyed positions or an infinitely adjustable positioning system.

Sway bar attachment members 30 may be coupled to hitch body 26 so that they are free to rotate about a vertical axis defined by bolt 38 (seen also in FIGS. 9-13). Additionally or alternatively, members 30 may be fixed in a given position so that they do not rotate. Additionally or alternatively, they may be configured to provide for only a limited range of rotation.

Each sway bar attachment member 30 may include a sway bar support hole 44 into which a first end of a sway bar (not shown) may insert, with the second end of the sway bar being coupled to a towed trailer.

As seen in the figures, each sway bar attachment member 30 includes, at one end distal the trailer, a substantially vertical cammed surface 48. The cammed surface of the sway bar attachment member interacts with a bias mechanism 50, which functions to both dampen and correct movement of a trailer to which the sway bar attachment member is coupled. The cammed surfaces are contoured so that when the tow vehicle turns, or the trailer begins a sideways movement, members 30 rotate in response thereto, with movement of the cammed surfaces being resisted by a bias mechanism 50. The bias mechanism resists movement of sway bar attachment member 30 away from its initial, resting (aligned) orientation or position and also provides an active spring or returning force back toward the initial, resting orientation or position. In acting on the cammed surface to resist side-to-side movement of the sway bar attachment member, bias mechanism 50 may resist side-to-side movement of a trailer to which it is attached via a sway bar.

In FIGS. 4 and 5, bias mechanism 50 includes a pair of spring plates 52 positioned parallel to each other and operatively coupled to the main hitch body 26. U-bolt 36 holds spring plates 52 in position between plates 32 and members 30 so that the spring plates may engage cammed surfaces 48. Spring plates 52 may also be described as one or more leaf springs that may provide resistance against the rotation of members 30, as described above.

The interaction of a cammed surface 48 with bias mechanism 50 may be direct (as shown in FIG. 4), or it may be indirect (as shown in FIG. 6). A "direct" interaction, to give one example, is shown in FIG. 4, where the cammed surface 48 of sway bar attachment member 30 directly and frictionally contacts a surface of a leaf spring 52, which performs the role of a bias mechanism in that embodiment. An "indirect" interaction, to give a second example, is shown in FIG. 6, where the cammed surface 48 of sway bar attachment member 30 contacts an intermediate structure (such as a pressure plate 66) between itself and the bias mechanism, which intermediate structure then transmits the force to the bias mechanism.

Various contoured shapes of cammed surfaces 48 are possible. A non-exclusive example includes a generally arcuate profile that has a radius of curvature greater than the distance from the surface of the cam to the member's axis of rotation about bolt 38. With such a configuration, the further a member 30 rotates, the greater the force applied by the cammed surface against the leaf springs. In another example, detailed in FIGS. 9-13, below, the cammed surface is multi-faceted, having a number of planar facets 76 that meet defined locations to form a number of corners 78. Other configurations are equally within the scope of the present disclosure.

Devices 20 are illustrated in the figures as including various bolts, washers, and other fasteners. However, other configurations are equally within the scope of the present disclosure. The coupling, connection, securing, and/or otherwise attaching of various portions of devices together may be provided by any suitable means including, but not limited to, bolting, welding, adhering, screwing, etc. Components of devices 20 may be made of steel or any other suitable material.

FIG. 6 also shows an anti-sway trailer hitch 20 according to the present disclosure. As shown, the bias mechanism 50 of FIG. 6 includes a plurality of spring washers 54, in particular, a plurality of Belleville spring washers 56, rather than leaf springs 52. The spring washers reside in a cylindrical housing 58, which restricts transmission of any force applied to the washers to a direction down the axis of the stack of washers.

A stack of Belleville spring washers 54 may be held in its housing, and coupled to movement of sway bar attachment member 30, via a number of accessory elements. These elements may include (moving from the washer stack 54 toward the member 30): a pressure plate 60, a snap ring 62, a shim 64, and a pressure plate 66. The function of the accessory elements may be to direct a force applied by a cammed surface 48 of a sway directing may allow the washers to more efficiently resist the applied force (i.e. dampen a rotation of the sway bar attachment member) and apply a counteracting force (i.e. correct the rotation by forcing the sway bar attachment member to turn the opposite way). As noted above, because there are a number of elements located between the sway bar attachment member and the stack of spring washers, this configuration of elements may be characterized as an "indirect" interaction or coupling between the sway bar attachment member and the bias mechanism.

FIG. 6 also shows a method of attaching a sway bar attachment member 30 to a sway controller 22. In FIG. 6, a clevis pin 68 and hairpin 70 couple the sway bar attachment member 30 and sway controller 22. Again, the sway bar attachment member is free to rotate about the axis of the pin 70.

FIG. 7 is a cutaway close-up view of the spring washer cylinder of FIG. 6, with the cut being made in FIG. 6 along line 7-7. As noted above, a stack 54 of Belleville spring washers 56 can provide the resistive force in a bias mechanism 50. As shown in FIG. 7, the stack 54 resides in a cylinder 58 that sits, in turn, between vertical plate 32 and horizontal plates 34. The stack 54 of washers 56 is supported at most points by cylinder 58, and is covered at its otherwise free end by pressure plate 60. The pressure plate is held in place by snap ring 62. Finally, a shim 64 and second pressure plate 66 cap the stack and provide an interface with the cammed surface 48 of a sway bar attachment member.

As seen in FIG. 7, stack 54 may be composed of ten Belleville spring washers in a 2-2-2-2-2 arrangement; that is, there are 5 groupings of 2 parallel spring washers. Belleville washers are also generally known as cupped spring washers, and are a type of non-flat washer. A Belleville spring washer is slightly concave, which gives the washer the characteristics of a spring. Collections of multiple Belleville washers may be stacked in different ways, with one exemplary stacking pattern shown in the Figures, to modify the spring constant or amount of deflection of a stack. Stacking washers in the same direction (i.e. in parallel) adds the spring constants in creating stiffness (with constant deflection). Stacking washers in alternating directions (i.e. in series) may be similar to adding springs in series, giving a lower spring constant with greater deflection. By varying the numbers of washers in parallel and series in a given stack, a specific spring constant and deflection capacity can be designed for a given purpose. Belleville spring washers are especially useful in applications, like the present one, where a high load (swinging trailer weight) must be supported in a small space. As an example, in the embodiment of FIG. 7 the stack 54 of Belleville washers can support a load of approximately 11,000 pounds without failure.

Figure 8:
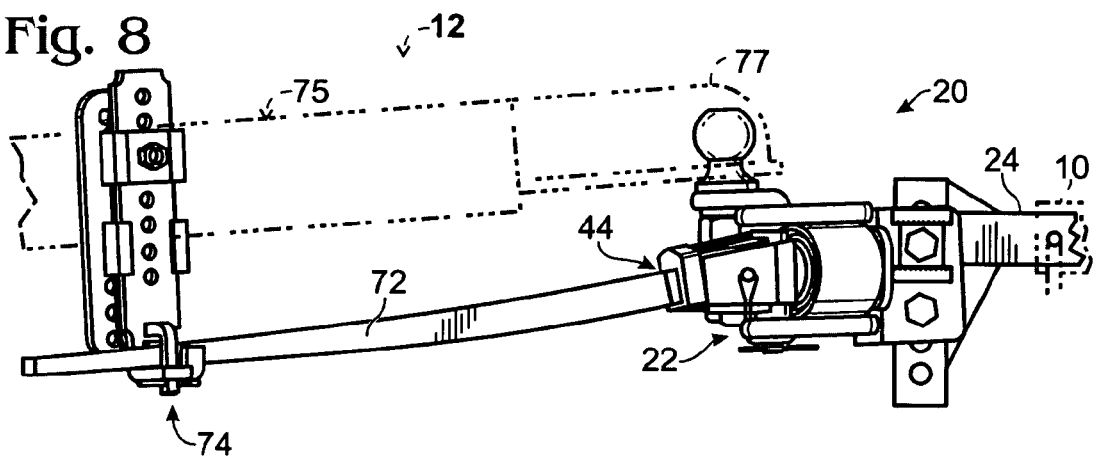
FIG. 8 is a side view of an operational relationship between the anti-sway trailer hitch device of FIG. 6 and a trailer clamp.

FIG. 8 shows a side view of a typical anti-sway trailer hitch 20 of the present disclosure in an operative configuration with shank 24 and sway bar 72. As shown in FIG. 8, one end of a sway bar 72 (the "proximal" end of the sway bar structure) inserts into a support hole 44 in an attachment member 30 of a sway controller 22. At the trailer end of the sway bar (the "distal" end), a trailer clamp 74 fixes the end of the sway bar 72 to the trailer or its trailer frame 75 (a portion of which is shown in dashed outline). Thus, in an operative relationship, a swaying motion of a trailer or its trailer frame 75 is transmitted by one or more trailer clamps 74 through one or more sway bars 72 into the sway controller 22. Sway controller 22 can then dampen and correct the swaying motion through the action of its bias mechanism.

FIGS. 9-13 show an anti-sway device according to the present disclosure in various configurations during operation. These Figures show how an anti-sway trailer hitch device 20 according to the present disclosure may provide an increasing resistance to and correction of trailer sway up through a "critical angle" and then release their resistance after that point. Such performance by the sway controller of the trailer hitch has the benefit of preventing and correcting trailer sway during towing while also allowing easy maneuverability of the vehicle and trailer combination in close quarters (e.g. in a parking lot, or at a boat ramp). For purposes of FIGS. 9-13, the working portion of bias mechanism 50 is shown as a "black box," not showing details of its mechanism of action.

Initially, recall that a cammed surface 48 of a sway bar attachment member 30 may be curved or faceted, as noted above. A cammed surface 48 having a number of facets 76 is shown in FIGS. 9-13. The facets meet at a number of corners 78. Thus, the cammed surface may have a number of resting positions at the facets 76, with increasing resistance to motion occurring as the sway bar attachment members 30 are rotated toward the protruding corners 78. Though presented in the context of a cammed surface with facets, the below discussion applies equally well to a cammed surface that is arcuate rather than faceted.

As shown in FIG. 9, an embodiment of an anti-sway trailer hitch device may initially be present in an "unhooked" configuration where the sway bar attachment members 30 are coupled to their respective bias mechanisms 50 on the hitch body but are not attached to the one or more sway bars of a trailer. In this initial "resting" position, the sway bar attachment members are oriented so that the cammed surfaces of the members reside such that a flat (or flatter) portion of the cammed surface 48 abuts the bias mechanism 50. In this position, angles A and B (each representing an angle between a centerline of a sway bar attachment member and a centerline of the hitch body) may each be approximately 30 degrees. In this native configuration, a compression or loading of the bias mechanism may be at its minimum, where "compression" or "loading" means addition of pressure to the bias mechanism. In FIG. 9, this is addition of pressure to pressure plate 66 and the top of the cylinder in which it resides.

FIG. 10 shows a configuration of sway bar attachment members 30 when the anti-sway trailer hitch device 20 is coupled to a trailer, such as through sway bars and trailer clamps (not shown). In this state, the sway bar attachment members 30 might be angled slightly inward, so as to initiate some slight compression of the bias mechanism. Loading the bias mechanism in this manner may allow it to respond more rapidly to trailer sway when the towing vehicle-trailer combination is under way. In the configuration of FIG. 10, angles A and B may each be approximately 25 degrees, since most A-frame trailers have their frames set at a 50-degree angle at the location of the trailer hitch. Compression of the bias mechanism may be slightly greater than zero in the configuration of FIG. 10, since some pressure is placed on the bias mechanism by a corner 78 of each cammed surface (or by a curved portion of a curved cammed surface).

FIG. 11 shows the bias mechanism in a configuration where it provides greatest resistance to sway and greatest biasing force. Such a configuration can result if a towed trailer is subjected to a very strong sideways influence, such as a very strong crosswind or vortex from a passing vehicle. In FIG. 11, one of the sway bar attachment members 30 (corresponding to angle A) is rotated to a position where the facet portion 76 at the greatest distance from the member's axis of rotation 82a is in contact with bias mechanism 50. The other sway bar attachment member 30 is just about to rotate to a similar position relative to its axis of rotation 82b. Angle B in this configuration is about 67 degrees.

If the "critical angle" of the anti-sway trailer hitch device is defined as an angle at which the bias mechanism of the hitch provides the greatest resistive and biasing force before dropping off, then the "critical angle" of the bias mechanism of FIG. 11 is 67 degrees, since resistive and compensating forces are maximized at that angle. Once the critical angle is passed, the resistive and biasing forces begin to drop off when the attachment members continue their rotation. Design parameters within control of the operator or manufacturer could change the critical angle according to preferences of the user or operational requirements of the hitch. For example, it may be possible to adjust the critical angle by manipulating the positions of keyed washers 40 (see FIG. 5).

FIG. 12 shows the bias mechanism in the configuration beyond the critical angle, where compression of the bias mechanism is dropping. A configuration like that shown in FIG. 12, where angle B is approximately 79 degrees, may occur when a driver of a vehicle towing a trailer is in close quarters and is making a tight turn or is attempting to park the trailer. Because maximum compression of the bias mechanism occurred at the critical angle and compression is dropping, the mechanism provides lower resistance to turning and bias toward the travel axis.

FIG. 13 shows that a bias mechanism according to the present disclosure is capable of reaching an angle of 90 degrees (angle B) while still providing some amount of resistive and biasing force. At this angle, the attachment member defining angle A may rest on a facet relatively closer to its axis of rotation 82a than the facet upon which it rested in the configuration represented by FIG. 11. The result is that compression of the bias mechanism is lower here than in FIG. 11. The other attachment member may likewise rest on a facet that is nearer to its axis of rotation 82b than the facet upon which it rested at the critical angle. Because the bias mechanism is past its critical angle, the force applied to the bias mechanism by attachment member 30 is dropping toward its minimum, as is compression of the mechanism.

Having described anti-sway trailer hitch structures according to the present disclosure, there remains a short discussion of use of the hitch. A user may first provide a trailer hitch or trailer hitch component including a sway bar attachment member 30, where the sway bar attachment member has a cammed surface 48. The sway bar attachment member may be coupled to a trailer by way of one or more sway bars, which may, in turn, be fastened to the trailer by way of trailer clamps 74. In this way, movement of the trailer may be coupled to movement in the trailer hitch. To prevent trailer sway, the user may also provide an appropriately configured bias mechanism 50 that is attached to the sway bar attachment member 30. An "appropriately configured" bias mechanism may prevent sway through an interaction of the cammed surface of the sway bar attachment member with a resistive and compensating force in the bias mechanism. According to embodiments of the present disclosure, both leaf spring-type structures and Belleville spring washer stacks may be used to provide the corrective force, with other structures possibly implemented.

While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or through presentation of new claims in this or a related application. Such claims, whether they are broader, narrower or equal in scope to the original claims, are also regarded as included within the subject matter of applicant's invention.

What is claimed is:

1. A device for a trailer hitch configured to couple a trailer to a towing vehicle, comprising:
a first sway bar attachment member configured to receive a sway bar for coupling the trailer hitch to the trailer, wherein a distal end of the first sway bar attachment member has a substantially vertical first cammed surface;

a second sway bar attachment member configured to receive a sway bar for coupling the trailer hitch to the trailer, wherein a distal end of the second sway bar attachment member has a substantially vertical second cammed surface; and a sway controller, wherein the sway controller includes a bias mechanism adapted to bias a travel axis of the trailer toward a travel axis of the towing vehicle via the sway bars through an interaction with the cammed surfaces of the first and second sway bar attachment members.

2. The device of claim 1 wherein the bias mechanism is configured to resist a swaying motion of the trailer and to apply a biasing force to the swaying trailer.

3. The device of claim 1 wherein the bias mechanism includes a spring structure.

4. The device of claim 3 wherein the spring structure includes at least one leaf spring.

5. The device of claim 3 wherein the spring structure includes at least one Belleville spring washer.

6. The device of claim 5 wherein the Belleville spring washer is housed in a cylinder.

7. The device of claim 5 wherein the Belleville spring washer structure includes ten Belleville spring washers in a 2-2-2-2-2 configuration.

8. The device of claim 1 wherein the cammed surface of each first and second sway bar attachment member is coupled to the bias mechanism of the sway controller.

9. The device of claim 8 wherein the cammed surface of each first and second sway bar attachment member is in frictional contact with the bias mechanism of the sway controller.

10. The device of claim 9 wherein the cammed surface of each of the first and second sway bar attachment member is a smooth cam surface.

11. The device of claim 9 wherein the cammed surface of each of the first and second sway bar attachment member is a multi-faceted cam surface.

12. A trailer hitch device configured to couple a trailer to a towing vehicle, comprising:

a hitch body including a trailer coupler;

a pair of sway bar attachment members, wherein each sway bar attachment member is configured to receive a sway bar for connecting the hitch body to the trailer, and has a substantially vertical cammed surface;

the pair of sway bar attachment members including a first sway bar attachment member rotatable about a first axis and a second sway bar attachment member rotatable about a second axis, the second axis spaced from the first axis; and a sway controller, wherein the sway controller includes a bias mechanism adapted to bias a travel axis of the trailer toward a travel axis of the towing vehicle via the sway bars through an interaction with the cammed surfaces of the sway bar attachment members.

13. The trailer hitch device of claim 12 wherein the bias mechanism includes a spring structure.

14. The trailer hitch device of claim 13 wherein the bias mechanism includes at least one of a leaf spring and a plurality of Belleville spring washers.

15. The trailer hitch device of claim 12 wherein each sway bar attachment member has a multi-faceted cammed surface.

16. The trailer hitch device of claim 15 wherein the interaction of the multi-faceted cammed surfaces of each sway bar attachment member and the bias mechanism is configured to provide increasing resistance to sway up to a critical angle and decreasing resistance to sway beyond the critical angle.

17. A trailer hitch device configured to couple a trailer to a towing vehicle, comprising:

a hitch body including a trailer coupler;

an elongate sway bar having first and second ends, the first end being configured for attachment to the trailer;

an elongate sway bar attachment member pivotally mounted on the hitch body, wherein the sway bar attachment member has a sway bar support hole configured for receipt of the second end of the sway bar and a substantially vertical cammed surface opposite the sway bar support hole; and a bias mechanism operatively engaging the cammed surface of the sway bar attachment member to bias the sway bar toward a position wherein a travel axis of the trailer attached to the sway bar is aligned with a travel axis of the towing vehicle.

18. The trailer hitch device of claim 17 wherein the bias mechanism includes at least one of a leaf spring structure and a plurality of Belleville spring washers.

19. The trailer hitch device of claim 17 wherein the sway bar attachment member includes a multi-faceted cammed surface.

20. The trailer hitch device of claim 19 wherein the bias mechanism is configured to interact with the multi-faceted cammed surface of the sway bar attachment member to provide increasing resistance to sway up to a critical angle and decreasing resistance to sway beyond the critical angle.

* * * * *